(12) United States Patent
Zhang

(10) Patent No.: US 7,728,391 B2
(45) Date of Patent: Jun. 1, 2010

(54) SMALL-PITCH THREE-DIMENSIONAL MASK-PROGRAMMABLE MEMORY

(76) Inventor: Guobiao Zhang, P.O. Box 6182, Carson City, NV (US) 89449-6182

( * ) Notice: Subject to any disclaimer, the term of this patent is extended or adjusted under 35 U.S.C. 154(b) by 50 days.

(21) Appl. No.: 11/936,069

(22) Filed: Nov. 6, 2007

(65) Prior Publication Data

US 2008/0054372 A1    Mar. 6, 2008

Related U.S. Application Data

(63) Continuation-in-part of application No. 11/736,757, filed on Apr. 18, 2007, which is a continuation-in-part of application No. 11/164,246, filed on Nov. 15, 2005, now Pat. No. 7,386,652, which is a continuation-in-part of application No. 11/036,448, filed on Jan. 15, 2005, now abandoned.

(60) Provisional application No. 60/559,683, filed on Apr. 4, 2004.

(51) Int. Cl.
*H01L 29/76* (2006.01)
(52) U.S. Cl. .................................. 257/390; 257/401
(58) Field of Classification Search ............ 257/390, 257/401
See application file for complete search history.

(56) References Cited

U.S. PATENT DOCUMENTS

| 4,881,114 | A  | 11/1989 | Mohsen et al. ............. 357/54 |
| 5,835,396 | A  | 11/1998 | Zhang ...................... 365/51 |
| 6,034,882 | A  | 3/2000  | Johnson et al. ............ 365/103 |
| 6,624,485 | B2 | 9/2003  | Johnson ................... 257/390 |
| 6,717,222 | B2 | 4/2004  | Zhang ..................... 257/390 |
| 6,903,427 | B2 | 6/2005  | Zhang ..................... 257/391 |
| 7,386,652 | B2 | 6/2008  | Zhang ..................... 711/101 |
| 7,423,304 | B2 | 9/2008  | Cleeves et al. ............ 257/278 |

OTHER PUBLICATIONS de Graaf et al, "*A Novel High-Density Low-Cost Diode Programmable Read Only Memory*" Technical Digest of International Electron Device Meeting, 1996.

*Primary Examiner*—Long Pham

(57) ABSTRACT

The present invention discloses a small-pitch three-dimensional mask-programmable memory (SP-3DmM). It is an ultra-low-cost and ultra-high-density semiconductor memory. SP-3DmM comprises a mask-programmable memory level stacked above the substrate. This memory level comprises diodes but no transistors or antifuses. Its minimum line pitch is smaller than the minimum gate pitch of the substrate transistors.

19 Claims, 5 Drawing Sheets

SMALL-PITCH THREE-DIMENSIONAL MASK-PROGRAMMABLE MEMORY

CROSS-REFERENCE TO RELATED APPLICATIONS

This application is a continuation-in-part of U.S. patent application Ser. No. 11/736,757, "Multimedia Three-Dimensional Memory (M3DM) System", filed Apr. 18, 2007, which is a continuation-in-part of U.S. patent application Ser. No. 11/164,246, "User-Configurable Pre-Recorded Memory", filed Nov. 15, 2005, which is a continuation-in-part of U.S. patent application Ser. No. 11/036,448, "User-Configurable Pre-Recorded Memory", filed Jan. 15, 2005, which is related to U.S. Provisional Application No. 60/559,683, "Improved Three-Dimensional Memory", filed Apr. 4, 2004 and Chinese P.R. patent application No. 200410081241.X, "Layout Design of Three-Dimensional Memory", filed Nov. 15, 2004.

BACKGROUND

1. Technical Field of the Invention

The present invention relates to the field of integrated circuit, and more particularly to diode-based semiconductor memory.

2. Prior Arts

With a simple structure, diode-based memory has a low manufacturing cost and high storage density. There are many types of diode-based memory. One is planar diode-based memory (referring to de Graaf et al. "A Novel High-Density Low-Cost Diode Programmable Read Only Memory", Technical Digest of the International Electron Device Meeting, 1996). As illustrated in FIG. 1, its chip comprises two areas: a memory array 10 and a peripheral circuit 20. The memory array 10 comprises a plurality of N+ word lines 18, P+ bit lines 12, and memory cells 17. Each memory cell 17 comprises an antifuse 16 and a diode. The diode is comprised of a P+ layer 12, a P− layer 14, and an N+ layer 18. The antifuse 16 is comprised of a thin dielectric, which has a high resistance when unprogrammed and a low resistance when programmed. The peripheral circuit 20, including drivers and sense-amplifiers, provides cell selection/programming/read function for the memory array 10. Its major building block are transistors 27, which further comprise gate 28 and source/drain 24.

In the planar diode-based memory, diodes 17 are located in the same plane (i.e. in the substrate 00) as transistors 27. Although diode itself requires a small mask count (in this case, seven), inclusion of transistors in the same plane leads to a higher mask count (in this case, eleven) and therefore, a relatively high manufacturing cost.

Another type of the diode-based memory is three-dimensional electrically-programmable memory (3D-EPM, referring to U.S. Pat. No. 5,835,396, "Three-Dimensional Read-Only Memory" issued to Zhang, U.S. Pat. No. 6,034,882, "Vertically Stacked Field Programmable Nonvolatile Memory and Method of Fabrication", issued to Johnson et al. and others). Among various three-dimensional memories (3D-M), 3D-EPM was considered having the greatest potential for commercialization in the past. As illustrated in FIG. 2, a 3D-EPM comprises at least two levels: a substrate level 30 and an electrically-programmable memory level 40. The memory level 40 comprises a plurality of world lines 42, bit lines 48 and memory cells 47. Each memory cell 47 comprises an antifuse 46 and a diode. The substrate level 30 comprises a plurality of transistors 37, which further comprise gate 38 and source/drain 34.

A major challenge faced by 3D-EPM is its scalability. Because the antifuse programming current does not scale with technology, its programming-current density increases in proportional to the square of the scaling factor. As 3D-EPM is scaled to more advanced technology, this programming-current density becomes too large to be tolerated by the connecting diode (at the 0.2 μm node, the programming-current density has reached $\sim 10^4$ A/cm$^2$). It is anticipated that 3D-EPM will have difficulty to scale to the 50 nm node. This, in turn, will greatly limit its storage density.

In sum, the prior-art diode-based memory has either a relatively high manufacturing cost, or a limited storage density. To overcome these shortcomings, the present invention discloses a small-pitch three-dimensional mask-programmable memory (SP-3DmM). SP-3DmM is an ultra-low-cost and ultra-high-density semiconductor memory.

OBJECTS AND ADVANTAGES

It is a principle object of the present invention to further increase the storage density of the diode-based memory.

It is a further object of the present invention to further lower the manufacturing cost of the diode-based memory.

In accordance with these and other objects of the present invention, the present invention discloses a small-pitch three-dimensional mask-programmable memory (SP-3DmM). SP-3DmM is an ultra-low-cost and ultra-high-density semiconductor memory.

SUMMARY OF THE INVENTION

At present, transistors (CMOS) are the bottleneck for technology scaling. Its scaling involves many factors, e.g. lithography, gate material, gate dielectric material, channel/source/drain engineering and others. On the other hand, diode scaling is much simpler: it is more or less limited by lithography alone. Accordingly, diode follows a different scaling law than transistor:

1) its critical dimension could be smaller than transistor. For example, diode may use the 35 nm technology, while transistor still uses the 50 nm technology.
2) its scaling can occur at a much faster rate than transistor. For example, it may take two years to scale diode for one generation, while it will take three years for transistor.

Hence, the diode-based memory can easily excel the transistor-based memory in storage density. Moreover, this density-gap will grow wider with time. Accordingly, more and more attention has been paid to the diode-based memory recently.

The prior-art diode-based memories have various shortcomings. The planar diode-based memory has a relatively high manufacturing cost, and three-dimensional electrically-programmable memory (3D-EPM) has a limited storage density. To overcome these shortcomings, the present invention discloses a small-pitch three-dimensional mask-programmable memory (SP-3DmM). SP-3DmM is an ultra-low-cost and ultra-high-density semiconductor memory.

SP-3DmM comprises a substrate having a plurality of functional transistors; and at least one mask-programmable memory level stacked above said substrate and coupled to selected ones of said functional transistors through a plurality of inter-level vias, said mask-programmable memory level comprising a plurality of diodes but no functional transistors; wherein the minimum line pitch of said mask-programmable memory level is smaller than the minimum gate pitch of said functional transistors. Here, "functional transistors" distinguish from "dummy transistors" in that they can perform certain chip functions; gate pitch is the center-to-center distance between gates of adjacent functional transistors; and line pitch is the center-to-center distance between adjacent address-selection lines.

Unlike the planar diode-based memory where diodes and transistors are located in the same plane (i.e. both in the substrate), diodes of SP-3DmM are located in a different plane (i.e. above the substrate) than transistors (i.e. in the substrate). Because it comprises no transistors, the mask-programmable memory level of SP-3DmM only needs a small mask count. Accordingly, it has a lower manufacturing cost than the prior-art planar diode-based memory.

Unlike 3D-EPM whose memory cells comprise antifuse and require electrical programming, the memory cells of SP-3DmM comprise no antifuse and do not require electrical programming. During operation, diodes are only subjected to read current. Because read current is much smaller than programming current, diodes in SP-3DmM can be scaled to a much smaller geometry than 3D-EPM. Accordingly, the storage density of SP-3DmM can be scaled to a much larger number than the prior-art 3D-EPM.

To extend the "small-pitch" concept, the minimum line pitch of SP-3DmM can be smaller than that of the contemporary transistor-based memory. Here, the contemporary transistor-based memory refers to the most advanced transistor-based memory which is in mass production around the same time as SP-3DmM. At present, it is the 50 nm flash. This preferred SP-3DmM will lead the conventional semiconductor memory by a wide margin in storage density.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 1:
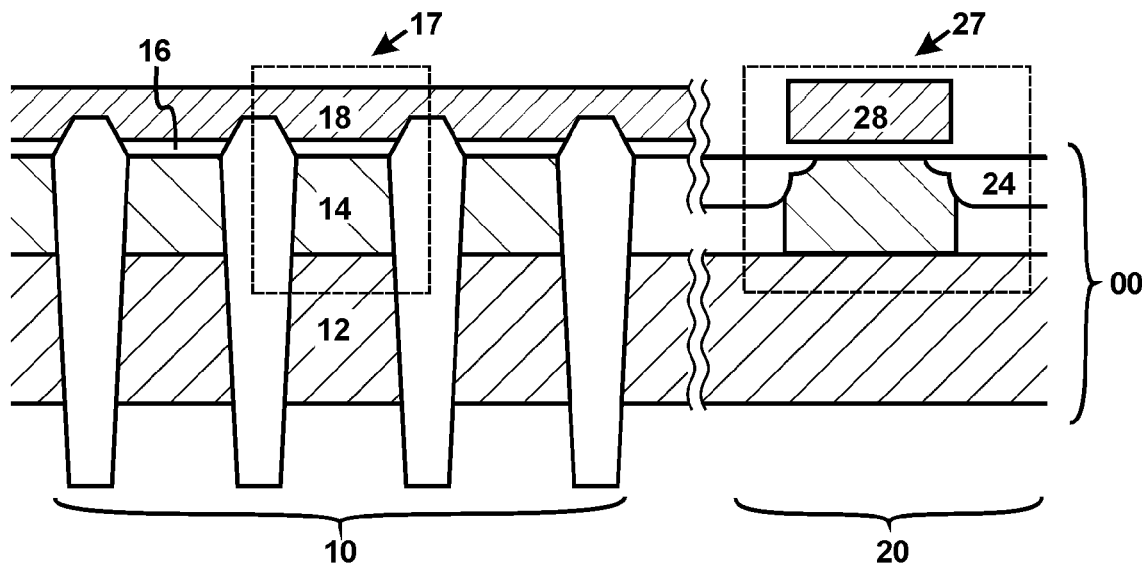
FIG. 1 is a cross-sectional view of a prior-art planar diode-based memory.
Figure 2:
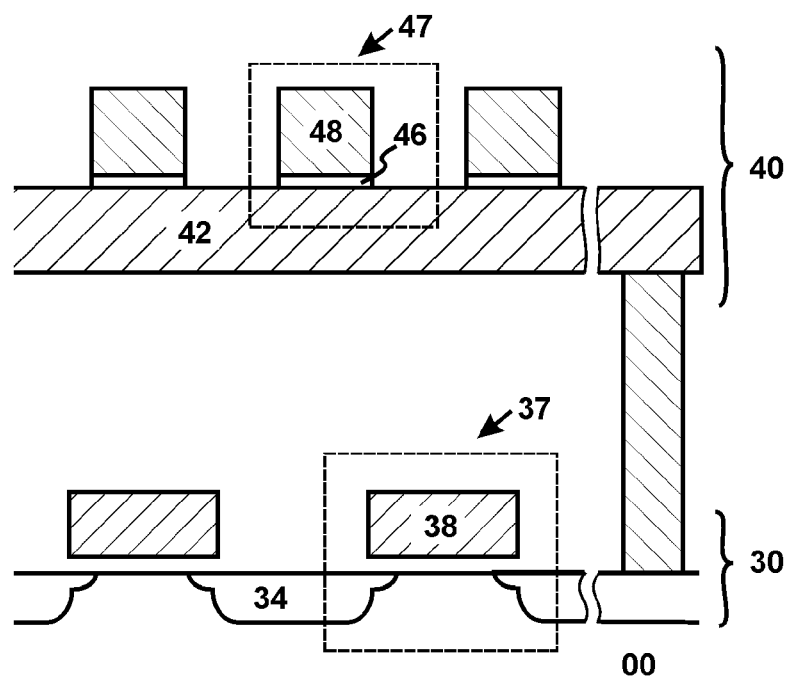
FIG. 2 is a cross-sectional view of a prior-art three-dimensional electrically-programmable memory (3D-EPM)
Figure 3:
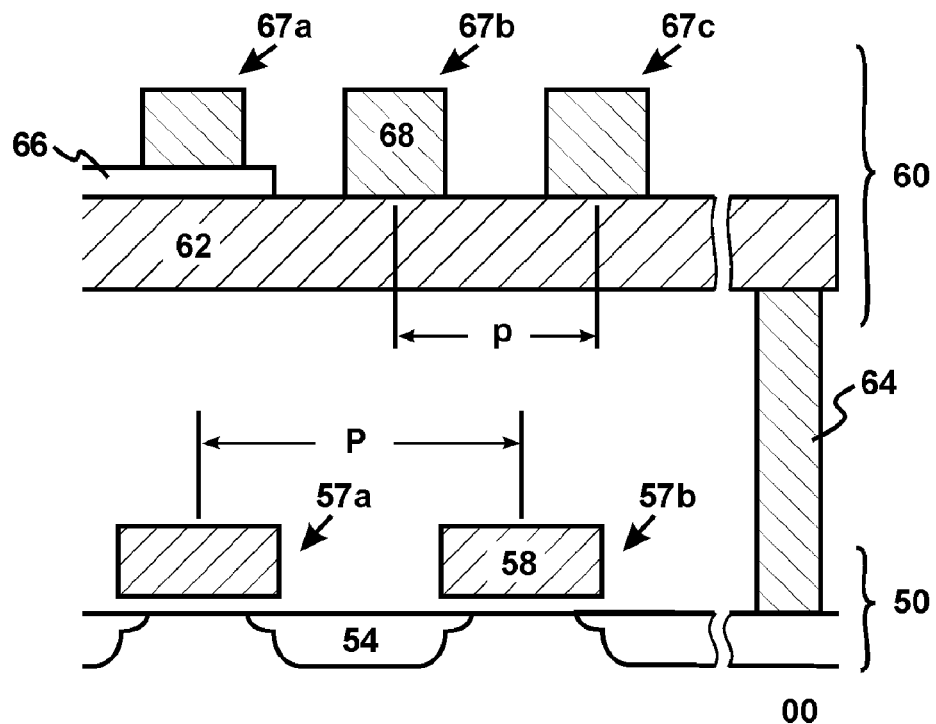
FIG. 3 is a cross-sectional view of a preferred small-pitch three-dimensional mask-programmable memory (SP-3DmM)

Referring now to FIG. 3, a preferred SP-3DmM is disclosed. It comprises a substrate level 50 and a mask-programmable memory level 60. The substrate level 50 comprises functional transistors 57a, 57b. They are located in the substrate 00. Here, "functional transistors" distinguish from "dummy transistors" in that they can perform certain chip functions. Gate pitch is the center-to-center distance between gates of adjacent functional transistors.

The mask-programmable memory level 60 is stacked above the substrate level 50. It comprises a plurality of address-selection lines 62, 68 (e.g. word lines and bit lines) and memory cells 67a-67c. The information stored in each memory cell 67a-67c is determined by the existence or absence of an info-dielectric 66. With info-dielectric 66, the memory cell represents logic "0"; without info-dielectric, the memory cell represents logic "1"; or, vice versa. In this preferred embodiment, the memory cells 67a-67c represent logic "0", "1", "1", respectively.

Each memory cell further comprises a diode. Diode is a two-terminal device. It has a higher resistance when the current flows in one direction than the other. Diode could be p-n diode, p-i-n diode, Schottky diode, or others. It could comprise poly-crystalline silicon, amorphous silicon or other semiconductor materials. More details on diode (also known as quasi-conduction layer) are disclosed in U.S. Pat. No. 5,835,396, "Three-Dimensional Read-Only Memory" issued to Zhang.

Unlike 3D-EPM whose memory cells 47 comprise antifuse 46 and require electrical programming, the memory cells 67a-67c of SP-3DmM comprise no antifuse and do not require electrical programming. During operation, diodes are only subjected to read current. Because read current is much smaller than programming current, diodes in SP-3DmM can be scaled to a much smaller geometry than 3D-EPM. Accordingly, the storage density of SP-3DmM can be scaled to a much larger number than the prior-art 3D-EPM.

In the mask-programmable memory level 60, line pitch is the center-to-center distance between adjacent address-selection lines. In SP-3DmM, the minimum line pitch p of the mask-programmable memory level 60 can be smaller than the minimum gate pitch P of the substrate level 50, because: A) diodes and transistors are formed in separate manufacturing steps and can be scaled independently; B) diodes can scale faster than transistors.

Unlike the planar diode-based memory where diodes 17 and transistors 27 are located in the same plane (i.e. both in the substrate 00), diodes 67a-67c of SP-3DmM are located in a different plane (i.e. above the substrate 00) than transistors 57a, 57b (i.e. in the substrate 00). Because it comprises no transistors, the mask-programmable memory level 60 of SP-3DmM only needs a small mask count. Accordingly, it has a lower manufacturing cost than the prior-art planar diode-based memory.

Transistors 57a, 57b in the substrate 00 can perform various functions for the diode-based memory of the memory level 60. They can form peripheral circuit, cache, and/or error-correction (or upgrade) circuit for the diode-based memory. These transistors 57a, 57b communicate with the diode-based memory through inter-level vias 64.

Figure 4:
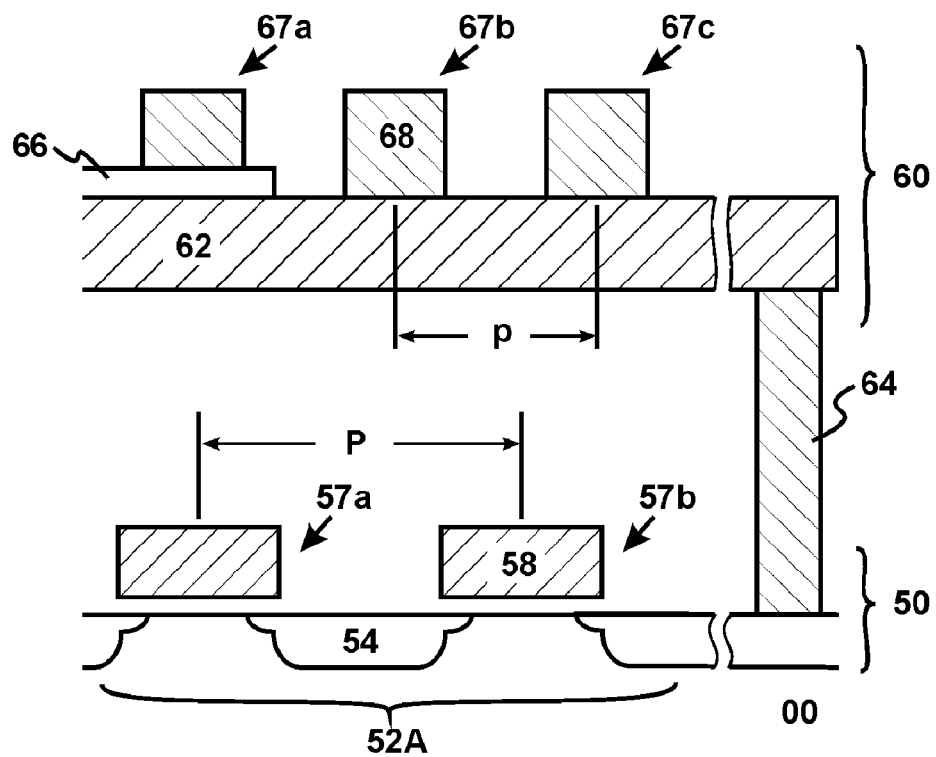
FIG. 4 is a cross-sectional view of a preferred SP-3DmM with a first preferred substrate circuit.

In the first preferred embodiment of FIG. 4, transistors 57a, 57b form the peripheral circuit 52A for the diode-based memory of the memory level 60. Through inter-level vias 64, this peripheral circuit can drive word lines 62 or amplify the read-out signal from bit lines 68.

Figure 5:
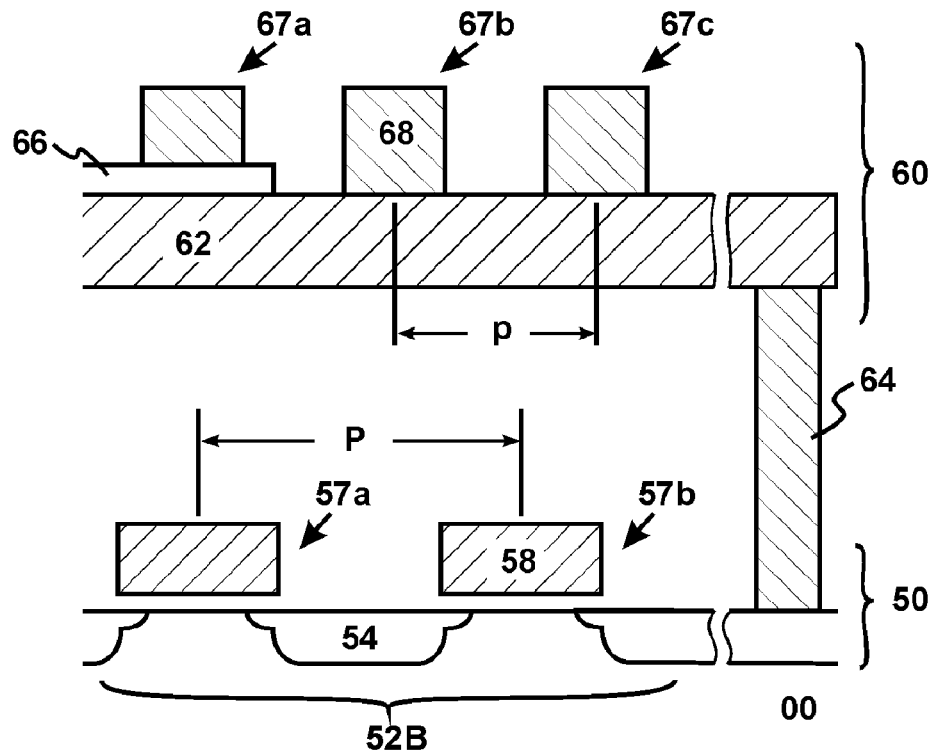
FIG. 5 is a cross-sectional view of a preferred SP-3DmM with a second preferred substrate circuit.
Figure 6:
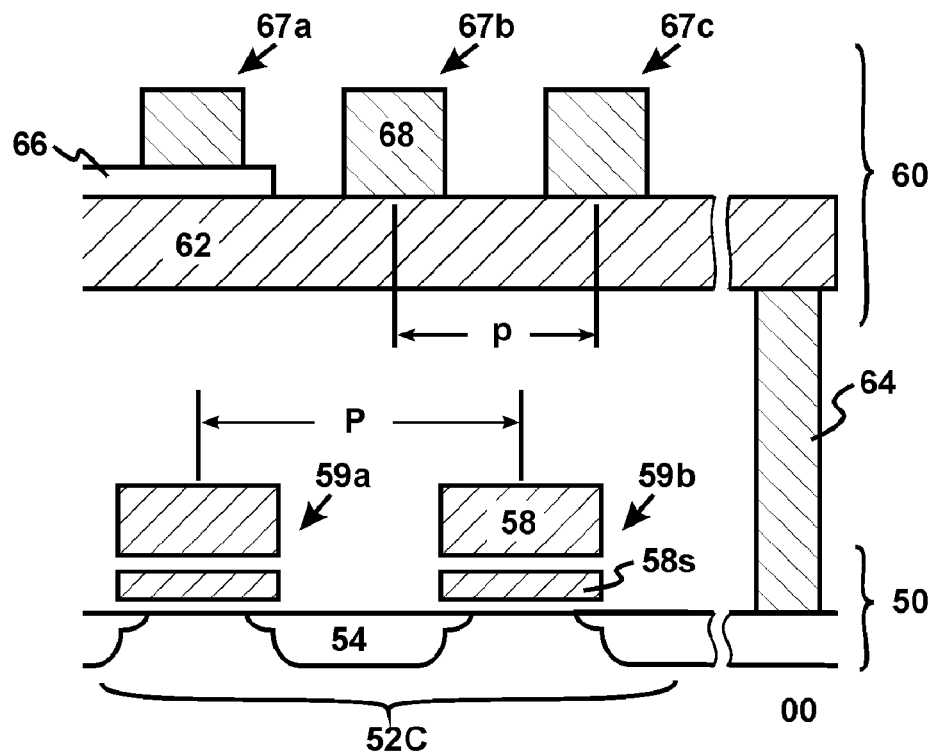
FIG. 6 is a cross-sectional view of a preferred SP-3DmM with a third preferred substrate circuit.

In the second and third preferred embodiments of FIGS. 5-6, transistors 57a, 57b form a transistor-based memory. Its minimum line pitch is larger than that of the diode-based memory of the memory level 60. In FIG. 5, this transistor-based memory forms a RAM 52B. Through inter-level vias 64, RAM 52B are coupled to the memory level 60 and can be used as a cache. More details on the embedded RAM are disclosed in U.S. Pat. No. 6,717,222, "Three-Dimensional Memory", issued to Zhang.

In FIG. 6, the transistor-based non-volatile memory (NVM) cells 59a, 59b form a ROM 52C. Besides control gate 58, the NVM cells 59a, 59b further comprise storage gate 58s. Through inter-level vias 64, ROM 52C are coupled to the memory level 60 and can store correctional data or upgrade code. More details on the embedded ROM are disclosed in U.S. Pat. No. 6,717,222, "Three-Dimensional Memory", issued to Zhang.

To extend the "small-pitch" concept, the minimum line pitch of SP-3DmM can be smaller than that of the contemporary transistor-based memory. Here, the contemporary transistor-based memory refers to the most advanced transistor-based memory which is in mass production around the same time as SP-3DmM. At present, it is the 50 nm flash. This preferred SP-3DmM will lead the conventional semiconductor memory by a wide margin in storage density.

Figure 7:
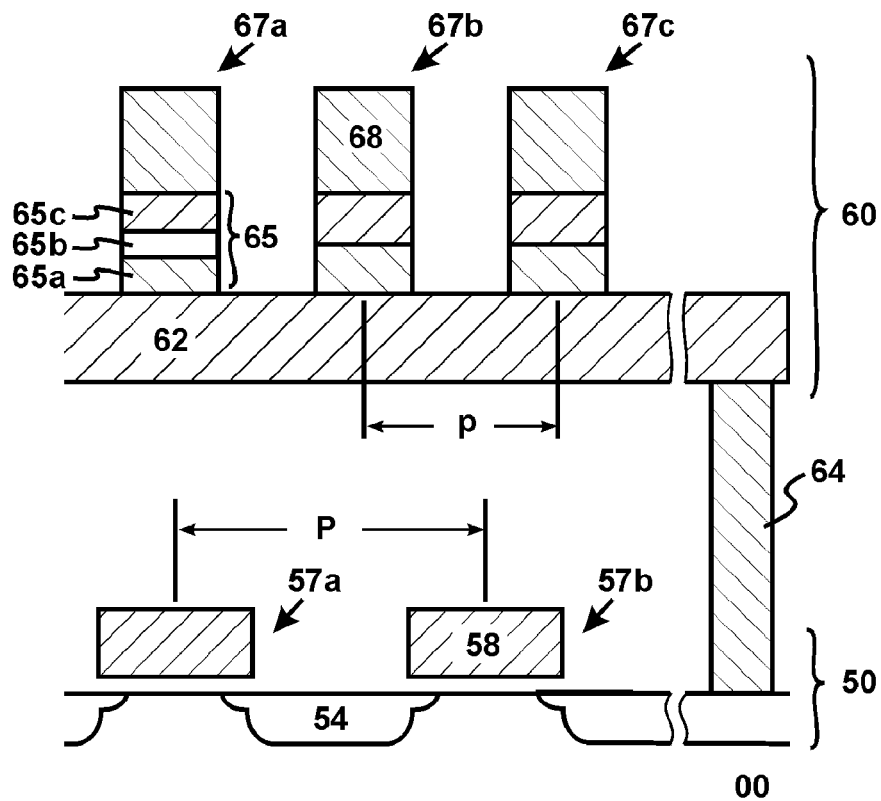
FIG. 7 is a cross-sectional view of a preferred SP-3DmM with pillar-shaped diodes.

The diodes in FIGS. 3-6 are natural-junction diodes. They are naturally formed at the intersection between word line 62 and bit line 68. To be more specific, a portion of word line 62 becomes the P+ region of the diode, and a portion of bit line 68 becomes the N+ region of the diode. Besides natural junction, diodes could be pillar-shaped. As illustrated in FIG. 7, a pillar-shaped diode 65 comprises a pillar 65, which by itself is a diode. This pillar 65 comprises a P+ region 65a, an info-dielectric 65b for logic "0" cell 67a (or, no info-dielectric for logic "1" cell 67b) and an N−/N+ region 65c. As a result, word line 62 does not need to comprise a P+ region and bit line 68 does not need to comprise an N+ region. More details on the pillar-shaped diodes are disclosed in U.S. patent application Ser. No. 11/309,657, "Improved Three-Dimensional Mask-Programmable Read-Only Memory" file by Zhang.

Figure 8:
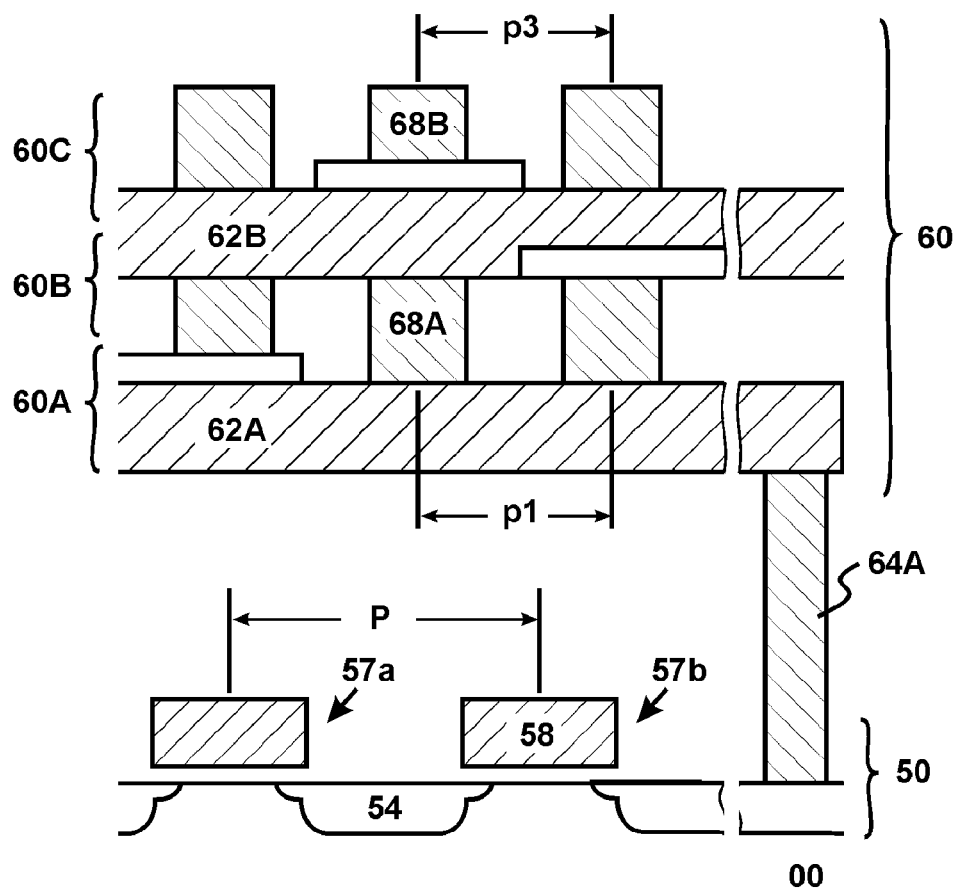
FIG. 8 is a cross-sectional view of a preferred SP-3DmM with three memory levels.

Referring now to FIG. 8, a preferred SP-3DmM with three memory levels 60A-60C is disclosed. This preferred embodiment is a shared 3D-M (also known as interleaved 3D-M in prior applications). Namely, two adjacent memory levels share one level of address-selection lines. For example, memory levels 60A, 60B share bit-line level 68A. Besides shared 3D-M, SP-3DmM may also be a separated 3D-M. Namely, two adjacent memory levels are separated by an inter-level dielectric. More details on shared and separated 3D-M's are disclosed in U.S. patent application Ser. No. 11/309,657, "Improved Three-Dimensional Mask-Programmable Read-Only Memory" file by Zhang.

To further lower the manufacturing cost, the inter-level vias 64 preferably have a large via pitch. Here, via pitch is the center-to-center distance between adjacent vias. Accordingly, the present invention discloses a preferred SP-3DmM with interleaved inter-level vias and/or with displaced inter-level vias. Its minimum via pitch pv is larger than the minimum line pitch p of the memory level 60.

Figure 9:
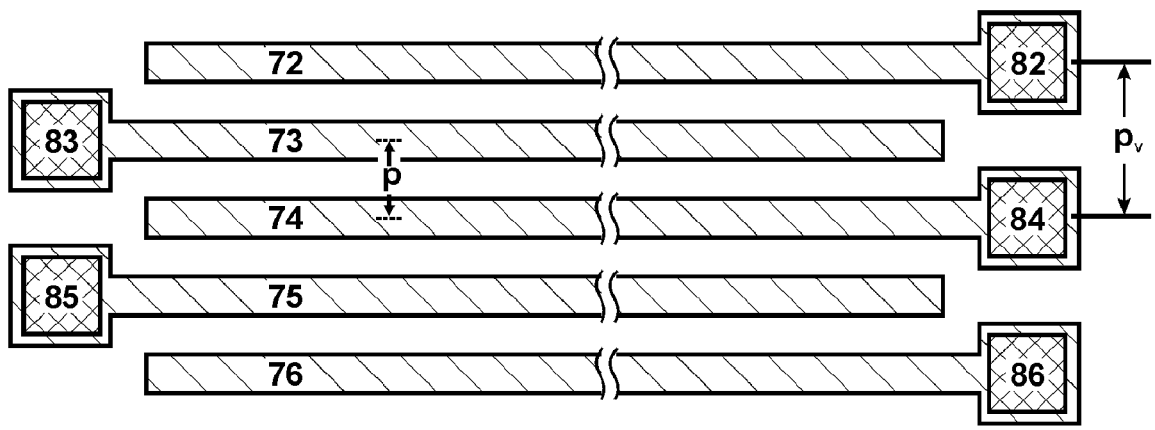
FIG. 9 is a top view of a preferred SP-3DmM with interleaved inter-level vias.

Referring now to FIG. 9, a preferred SP-3DmM with interleaved inter-level vias is disclosed. Its address-selection lines 72-76 are grouped into two sets. Address-selection lines 72, 74 and 76 belong to the first set and couple to the inter-level vias 82, 84, and 86 to the right, while address-selection lines 73, 75 belong to the second set and couple to the inter-level vias 83, 85 to the left. Because these inter-level vias 82-86 are interleaved, their via pitch pv could be twice as much as the minimum line pitch p of the memory level 60.

Figure 10:
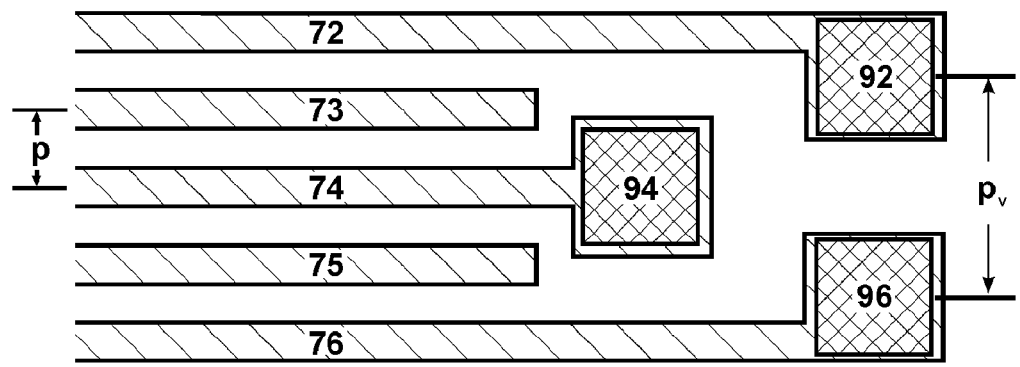
FIG. 10 is a top view of a preferred SP-3DmM with displaced inter-level vias.

Referring now to FIG. 10, a preferred SP-3DmM with displaced inter-level vias is disclosed. Besides being interleaved, the inter-level vias 92, 96 are further displaced along the line direction with respect to the inter-level via 94. As a result, their via pitch pv could be even larger. In this preferred embodiment, it could be three times as much as the minimum line pitch p.

While illustrative embodiments have been shown and described, it would be apparent to those skilled in the art that may more modifications than that have been mentioned above are possible without departing from the inventive concepts set forth therein. The invention, therefore, is not to be limited except in the spirit of the appended claims.

What is claimed is:

1. A small-pitch three-dimensional mask-programmable memory (SP-3DmM), comprising:

a semiconductor substrate having a peripheral circuit, said peripheral circuit comprising a plurality of functional transistors, said functional transistors comprising a plurality of gates in parallel; and at least one mask-programmable memory level stacked above said substrate and coupled to said peripheral circuit through a plurality of inter-level vias, said mask-programmable memory level comprising a plurality of diodes and a plurality of address-selection lines in parallel, said diodes coupled to said address-selection lines, whereby said peripheral circuit reads data from said mask-programmable memory level;

wherein the minimum pitch of said address-selection lines of said mask-programmable memory level is smaller than the minimum pitch of said gates of said functional transistors.

2. The SP-3DmM according to claim 1, wherein said mask-programmable memory level comprises no functional transistor.

3. The SP-3DmM according to claim 1, wherein said mask-programmable memory level requires no electrical programming.

4. The SP-3DmM according to claim 1, wherein said mask-programmable memory level comprises no antifuse.

5. The SP-3DmM according to claim 1, wherein:

said substrate further comprises a transistor-based memory, said transistor-based memory comprising a plurality of gates in parallel;

wherein the minimum pitch of said address-selection lines of said mask-programmable memory level is smaller than the minimum pitch of said gates of said transistor-based memory.

6. The SP-3DmM according to claim 5, wherein said transistor-based memory comprises an embedded RAM.

7. The SP-3DmM according to claim 5, wherein said transistor-based memory comprises an embedded ROM.

8. The SP-3DmM according to claim 1, wherein said diodes are natural-junction diodes.

9. The SP-3DmM according to claim 1, wherein said diodes are pillar-shaped diodes.

10. The SP-3DmM according to claim 1, wherein said diodes are junction diodes.

11. The SP-3DmM according to claim 10, wherein said junction diodes are p-n junction diodes.

12. The SP-3DmM according to claim 10, wherein said junction diodes are p-i-n junction diodes.

13. The SP-3DmM according to claim 1 wherein said diodes are Schottky diodes.

14. The SP-3DmM according to claim 1, further comprising at least two mask-programmable memory levels stacked above said substrate and coupled to said peripheral circuit.

15. The SP-3DmM according to claim 14, wherein adjacent mask-programmable memory levels share a level of address-selection lines.

16. The SP-3DmM according to claim 14, wherein adjacent mask-programmable memory levels are separated by an inter-level dielectric.

17. The SP-3DmM according to claim 1, wherein the minimum via pitch of said inter-level vias is larger than the minimum line pitch of said mask-programmable memory level.

18. The SP-3DmM according to claim 17, wherein selected ones of said inter-level vias are interleaved with respect to each other.

19. The SP-3DmM according to claim 17, wherein selected ones of said inter-level vias are displaced with respect to each other.

* * * * *